(12) United States Patent
Totani et al.

(10) Patent No.: US 12,543,945 B2
(45) Date of Patent: Feb. 10, 2026

(54) IMAGE PROCESSING DEVICE AND OPHTHALMIC DEVICE PROVIDED WITH THE SAME

(71) Applicant: Tomey Corporation, Nagoya (JP)

(72) Inventors: Kota Totani, Nagoya (JP); Satoshi Sugiyama, Nagoya (JP)

(73) Assignee: TOMEY CORPORATION, Nagoya (JP)

( * ) Notice: Subject to any disclaimer, the term of this patent is extended or adjusted under 35 U.S.C. 154(b) by 516 days.

(21) Appl. No.: 18/075,710

(22) Filed: Dec. 6, 2022

(65) Prior Publication Data

US 2023/0172446 A1 Jun. 8, 2023

(30) Foreign Application Priority Data

Dec. 8, 2021 (JP) .................................. 2021-199358

(51) Int. Cl.
*A61B 3/00* (2006.01)
*A61B 3/10* (2006.01)
(Continued)

(52) U.S. Cl.
CPC .......... *A61B 3/0025* (2013.01); *A61B 3/0041* (2013.01); *A61B 3/102* (2013.01); *A61B 3/14* (2013.01); *G06F 3/04845* (2013.01)

(58) Field of Classification Search
CPC ..... A61B 3/0025; A61B 3/0041; A61B 3/102; A61B 3/14; A61B 3/0016; G06F 3/04845;
(Continued)

(56) References Cited

U.S. PATENT DOCUMENTS

| 2005/0275911 A1* | 12/2005 | Yamada | H04N 1/60 |
| | | | 358/518 |
| 2006/0062435 A1* | 3/2006 | Yonaha | G06T 11/60 |
| | | | 382/118 |

(Continued)

FOREIGN PATENT DOCUMENTS

| EP | 2617351 A1 | 7/2013 |
| JP | 2016-057197 A | 4/2016 |

(Continued)

OTHER PUBLICATIONS

Anonymous: "Interactive image comparison with sliding splitter in MATLAB, Alec's Web Log", Apr. 22, 2014, pp. 1-3, XP093013704, Retrieved from the Internet: URL:https://www.alecjacobson.com/weblog?p=3901 (accessed Jan. 13, 2023).

(Continued)

*Primary Examiner* — Mohammed A Hasan
(74) *Attorney, Agent, or Firm* — Jason A. Smith; Shumaker, Loop & Kendrick, LLP

(57) ABSTRACT

An image processing device may include a first image input unit to which a first photographed image obtained by photographing a specific part of the subject eye is inputted, a second image input unit to which a second photographed image obtained by photographing the specific part is inputted, and display unit configured to display a synthesized image obtained by synthesizing the first and second photographed image. The synthesized image may be partitioned into at least a first region and a second region by a first boundary line. The display unit may be configured to display, in the first region, at least a portion which is a part of the first photographed image and corresponds to the first region. The display unit may be configured to display, in the second region, at least a portion, which is a part of the (Continued)

second photographed image and corresponds to the second region.

6 Claims, 13 Drawing Sheets

(51) Int. Cl.
*A61B 3/14* (2006.01)
*G06F 3/04845* (2022.01)

(58) Field of Classification Search
CPC ....... G06F 3/0486; G06T 11/60; G16H 30/20; G16H 30/40
USPC .......................................... 351/206
See application file for complete search history.

(56) References Cited

U.S. PATENT DOCUMENTS

| | | | | |
|---|---|---|---|---|
| 2008/0174734 A1* | 7/2008 | Shimizu | ............... | A61B 3/14 351/206 |
| 2008/0187187 A1* | 8/2008 | Tezuka | ............... | H04N 23/661 382/118 |
| 2008/0204655 A1* | 8/2008 | Kikawa | ............ | G01B 9/02089 351/206 |
| 2009/0087123 A1* | 4/2009 | Izawa | ............... | H04N 23/611 382/284 |
| 2012/0212641 A1* | 8/2012 | Tezuka | ............... | H04N 23/80 348/222.1 |
| 2016/0069664 A1 | 3/2016 | Yamanari | | |
| 2016/0119607 A1* | 4/2016 | Konno | ............. | G06T 3/00 348/47 |
| 2022/0398701 A1 | 12/2022 | Tanabe et al. | | |

FOREIGN PATENT DOCUMENTS

| | | |
|---|---|---|
| JP | 2020-156909 A | 10/2020 |
| WO | 2021/038847 A1 | 3/2021 |

OTHER PUBLICATIONS

Anonymous: "How to—Image Comparison Slider Image Comparison Slider Try it Yourself, The Wayback Machine", Dec. 4, 2021, pp. 1-8, XP093013717, Retrieved from the Internet: URL:https://web.archive.org/web/20211204202853/https://www.w3schools.com/howto/howtojs_image_comparison.asp (accessed Jan. 13, 2023).
Anonymous: "3 Layer Image After/Before Comparison Slider, CSS Script", Jul. 16, 2017 (Jul. 16, 2017), pp. 1-11, XP0393014095, Retrieved from the Internet URL: https://www.csssciipt.com/3-layer-image-afterbefore-comparisonslider/ (accessed on Jan. 16, 2023).

* cited by examiner

IMAGE PROCESSING DEVICE AND OPHTHALMIC DEVICE PROVIDED WITH THE SAME

CROSS-REFERENCE TO RELATED APPLICATION

This application claims priority to Japanese Patent Application No. 2021-199358, filed on Dec. 8, 2021, the entire contents of which are incorporated herein by reference.

TECHNICAL FIELD

The art disclosed herein relates to an image processing device configured to process a photographed image of a subject eye.

BACKGROUND

In an ophthalmic device, a specific part of a subject eye (such as crystalline lens and retina) is photographed in accordance with symptoms, which a patient is exhibiting. In doing so, in order to identify the condition of the subject eye in detail, a plurality of images may be obtained by processing image data obtained by photographing the same part of the subject eye. For example, a polarization-sensitive OCT in Japanese Patent Application Publication No. 2016-57197 obtains a plurality of images (such as a tomographic image, a birefringence image, and an entropy image) from image data obtained by photographing the same part of a subject eye.

SUMMARY

In the conventional art, the plurality of images obtained from the same part of a subject eye was displayed one at a time in a screen, or those images were displayed simultaneously on the screen. When the plurality of images is displayed one at a time in the screen, each image can be displayed large thus details therein can easily be examined, however, it is difficult to compare multiple images. On the other hand, when the plurality of images is displayed in the screen simultaneously, it becomes easy to compare the multiple images, however, the details in each image cannot easily be examined since those images are displayed small.

The disclosure herein discloses art to facilitate comparison of a plurality of images obtained from the same part of a subject eye and examination of details of the plurality of images.

An image processing device disclosed herein may be configured to process a photographed image of a subject eye. The image processing device may comprise a first image input unit to which a first photographed image obtained by photographing a specific part of the subject eye is inputted, a second image input unit to which a second photographed image obtained by photographing the specific part of the subject eye is inputted, and display unit configured to display a synthesized image obtained by synthesizing the first photographed image and the second photographed image. The synthesized image may be partitioned into at least a first region and a second region by a first boundary line. The display unit may be configured to display, in the first region, at least a portion, which is a part of the first photographed image and corresponds to the first region within the specific part. The display unit may be configured to display, in the second region, at least a portion, which is a part of the second photographed image and corresponds to the second region within the specific part. An image displayed in the first region may be different from an image displayed in the second region.

In the above image processing device, the synthesized image in which the first and second photographed images obtained by photographing the specific part of the subject eye are synthesized is displayed on the display unit. The synthesized image is partitioned into the first and second regions by the first boundary line, where a part of the first photographed image (a portion of the specific part corresponding to the first region) is displayed in the first region and a part of the second photographed image (a portion of the specific part corresponding to the second region) is displayed in the second region. Since the part of the first photographed image and the part of the second photographed image are synthesized and displayed, the scale of the photographed images can be suppressed from being decreased. Due to this, details of the photographed images can easily be examined. Further, since the first and second photographed images are displayed simultaneously, these images can easily be compared.

An ophthalmic device disclosed herein may comprise a polarization-sensitive OCT configured to photograph a subject eye, an image generation unit configured to generate a plurality of images by photographing a specific part of the subject eye with the polarization-sensitive OCT, and an image processing device disclosed herein configured to process the plurality of images generated by the image generation unit.

In the above ophthalmic device, the plurality of images generated by photographing the specific part of the subject eye using the polarization-sensitive OCT is displayed using the image processing device disclosed herein. The plurality of images is displayed simultaneously, and also the scale (size) of the plurality of images is suppressed from decreasing. Due to this, details of the plurality of images can easily be examined and those images can easily be compared.

DETAILED DESCRIPTION

Figure 1:
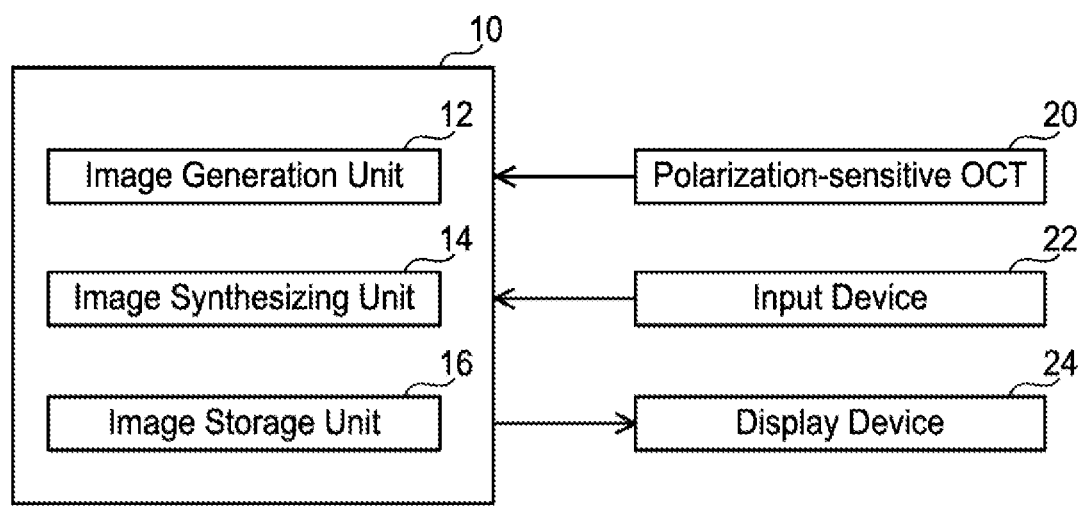
FIG. 1 is a block diagram showing a schematic configuration of an ophthalmic device of an embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in con junction with other features and teachings to provide improved image processing devices and ophthalmic devices, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure.

Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Some of the features characteristic to the technology disclosed herein will be listed below. It should be noted that the respective technical elements are independent of one another, and are useful solely or in combinations. The combinations thereof are not limited to those described in the claims as originally filed.

The image processing device disclosed herein may further comprise a first boundary line input unit configured to input a position of the first boundary line. The first region may be one of two regions defined by partitioning the synthesized image by the first boundary line, the second region may be the other one of the two regions defined by partitioning the synthesized image by the first boundary line. The first boundary line input unit may be configured to be operated by an operator, and the position of the first boundary line may be configured to be changed by the operator. According to such a configuration, the first and second photographed images can be compared while the position of the first boundary line is being changed.

The image processing device disclosed herein may further comprise a third image input unit to which a third photographed image obtained by photographing the specific part of the subject eye is inputted. The display unit may be configured to display a synthesized image obtained by synthesizing the first photographed image, the second photographed image, and the third photographed image. The synthesized image may be partitioned into at least the first region, the second region, and a third region by the first boundary line and a second boundary line. The display unit may be configured to display, in the third region, at least a portion which is a part of the third photographed image and corresponds to the third region within the specific part. According to such a configuration, the first, second, and third photographed images can easily be compared with each other.

The image processing device disclosed herein may further comprise a first boundary line input unit configured to input a position of the first boundary line, and a second boundary line input unit configured to input a position of the second boundary line. The first boundary line input unit may be configured to be operated by an operator, and the position of the first boundary line may be configured to be changed by the operator. The second boundary line input unit may be configured to be operated by the operator, and the position of the second boundary line may be configured to be changed by the operator. According to such a configuration, the first, second, and third photographed images can easily be compared while the positions of the two boundary lines are being changed.

In the image processing device disclosed herein, the display unit may be configured to display, in at least one of the first region, the second region, and the third region, a superimposed image obtained by superimposing at least two of the first photographed image, the second photographed image, and the third photographed image. When displaying the superimposed image in the first region, the display unit may be configured to display an image obtained by superimposing a portion which is a part of the first photographed image and corresponds to the first region within the specific part and a portion which is a part of at least one of the second photographed image and the third photographed image and corresponds to the first region within the specific part. When displaying the superimposed image in the second region, the display unit may be configured to display an image obtained by superimposing a portion which is a part of the second photographed image and corresponds to the second region within the specific part and a portion which is a part of at least one of the first photographed image and the third photographed image and corresponds to the second region within the specific part. When displaying the superimposed image in the third region, the display unit may be configured to display an image obtained by superimposing a portion which is a part of the third photographed image and corresponds to the third region within the specific part and a portion which is a part of at least one of the first photographed image and the second photographed image and corresponds to the third region within the specific part. According to such a configuration, a plurality of photographed images can easily be compared by displaying the superimposed image obtained by superimposing the plurality of photographed images.

The image processing device disclosed herein may further comprise a third image input unit to which a third photographed image obtained by photographing the specific part of the subject eye is inputted. The display unit may be configured to display a synthesized image obtained by synthesizing the first photographed image, the second photographed image, and the third photographed image. The synthesized image may be a rectangular image and may have a pair of first sides extending in an X-axis direction and a pair of second sides extending in a Y-axis direction. The synthesized image may be partitioned into a plurality of regions by the first boundary line and a second boundary line. Each of the first boundary line and second boundary line may be a straight line extending parallel to the pair of first sides or the pair of second sides. The display unit may be configured to display, in a region among the regions located between the first boundary line and one of the pair of first sides or one of the pair of second sides parallel to the first boundary line within the synthesized image, an image obtained by superimposing a portion of the first photographed image and a portion of the second photographed image corresponding to the region. The display unit may be configured to display, in a region among the regions located between the second boundary line and the other of the pair of first sides or the other of the pair of second sides parallel to the first boundary line within the synthesized image, an image obtained by superimposing a portion of the second photographed image and a portion of the third photographed image corresponding to the region. When the first boundary line is located closer to the one of the pair of first sides or the one of the pair of second sides and the second boundary line is located closer to the other of the pair of first sides or the other of the pair of second sides, the display unit may be configured to display, in a region among the regions located between the first boundary line and the second boundary line, a portion of the second photographed image corresponding to the region. When the first boundary line is located closer to the other of the pair of first sides or the other of the pair of second sides and the second boundary line is located closer to the one of the pair of first sides or the one of the pair of second sides, the display unit may be configured to display, in a region among the regions located between the first boundary line and the second boundary line, an image obtained by superimposing a portion of the first photographed image, a portion of the second photographed image, and a portion of the third photographed image corresponding to the region. According to such a configuration as well, the plurality of photographed images can easily be compared.

In the image processing device disclosed herein, the first photographed image may be a birefringence image obtained by photographing the subject eye with a polarization-sensitive OCT, the second photographed image may be a light scattering intensity image obtained by photographing the subject eye with the polarization-sensitive OCT, and the third photographed image may be an entropy image obtained by photographing the subject eye with the polarization-sensitive OCT.

EMBODIMENT

Hereinbelow, an ophthalmic device of an embodiment will be described. This ophthalmic device of the embodiment comprises a polarization-sensitive OCT 20, a processing device 10 configured to generate a plurality of images from interference signals detected in the polarization-sensitive OCT 20 and synthesize the generated plurality of images, a display device 24 configured to display image(s) that are generated and/or synthesized by the processing device 10, and an input device 22 for inputting an operator's instruction to the processing device 10. In the present embodiment, an example of "image processing device" disclosed herein is constituted by the processing device 10, the display device 24, and the input device 22.

The polarization-sensitive OCT 20 is a Fourier domain OCT that uses sweeping light source (swept-source optical coherence tomography (SS-OCT)), and is a polarization-sensitive OCT (PS-OCT) capable of capturing polarization characteristics of a subject eye. The polarization-sensitive OCT 20 is configured to generate interference light by combining measurement light obtained by emitting light outputted from a light source to the subject eye (reflected light from the subject eye) and reference light generated from the light outputted from the light source, and detect the generated interference light. The interference light detected in the polarization-sensitive OCT 20 is converted into interference signals (that is, image data) and is inputted to the processing device 10. In the polarization-sensitive OCT 20 of the present embodiment, the light from the light source is split into a vertical polarization component and a horizontal polarization component, and first emission light and second emission light are thereby generated. Moreover, the light from the light source is split into a vertical polarization component and a horizontal polarization component, and first reference light and second reference light are thereby generated. Further, first interference light is generated by combining the first reference light and a vertical polarization component of first measurement light that is obtained by emitting the first emission light to the subject eye, and second interference light is generated by combining the first reference light and a horizontal polarization component of the first measurement light. Similarly, third interference light is generated by combining the second reference light and a vertical polarization component of second measurement light that is obtained by emitting the second emission light to the subject eye, and fourth interference light is generated by combining the second reference light and a horizontal polarization component of the second measurement light. As such, the polarization-sensitive OCT 20 is configured to generate the first to fourth interference light from the same part of the subject eye, and input first to fourth interference signals obtained from the first to fourth interference light to the processing device 10. Further, the polarization-sensitive OCT 20 comprises a camera (not shown) configured to photograph an image of an anterior part of the subject eye and a camera (not shown) configured to photograph an image of a fundus, and the images photographed by these cameras are also inputted to the processing device 10. Since a known configuration (such as the configuration described in Japanese Patent Application Publication No. 2016-57197) may be used as the configuration of the polarization-sensitive OCT 20, thus detailed description thereof will be omitted herein.

The processing device 10 may be configured by a computer that comprises a CPU, a ROM, and a RAM, and a photographing process of causing the polarization-sensitive OCT 20 to photograph the subject eye, and a display process of causing the display device 24 to display a tomographic image and the like obtained by photographing the subject eye may be executed by executing a program stored in the ROM. That is, the processing device 10 functions as an image generation unit 12, an image synthesizing unit 14, and an image storing unit 16.

The image generation unit 12 is configured to generate tomographic images having four polarization characteristics (HH, HV, VH, VV) from the same part of the subject eye by performing processing such as Fourier transform on the first to fourth interference signals inputted from the polarization-sensitive OCT 20. Further, by using tomographic images photographed by emitting vertical waves on the subject eye (VH, VV tomographic images) and tomographic images photographed by emitting horizontal waves on the subject eye (HH, HV tomographic images), the image generation unit 12 can further generate not only a tomographic image that indicates tissues in the subject eye by light scattering intensity (a so-called 'regular' tomographic image (hereinbelow termed "light scattering intensity tomographic image")), but also a tomographic image indicating entropy in the subject eye (hereinbelow termed "entropy tomographic image"), a tomographic image indicating birefringence in the subject eye (hereinbelow termed "birefringence tomographic image"), a tomographic image indicating directions in which fibers in the subject eye extend, and a tonographic image indicating blood flow in the subject eye. Known methods can be used as processes to generate the respective tomographic images from the tomographic images with the four polarization characteristics (HH, HV, VH, VV), thus the detailed description thereof will herein be omitted.

The image synthesizing unit 14 is configured to generate images to be displayed on the display device 24 by synthesizing the respective tomographic images generated by the image generation unit 12 ("synthesize" described herein includes "superimpose" to be described later). Specific examples of the images to be displayed on the display device 24 will be described later in detail. The respective image data generated in the image generation unit 12 and the image synthesizing unit 14 are stored in the image storing unit 16 along with data such as identification information for identifying the subject eye (such as a patient ID) and the photographed date.

The display device 24 is configured to display the images outputted from the image generation unit 12 and/or the image synthesizing unit 14. The operator can identify the condition of the subject eye from the images displayed on the display device 24.

The input device 22 is configured of a keyboard and/or a pointing device such as a mouse, By the operator inputting instructions to the processing device 20 using the input device 22, the operator can cause the polarization-sensitive OCT 20 to photograph the subject eye, and cause the display device 24 to display desired image(s). In the present embodiment, the display device 24 and the input device 22 are configured as separate devices, however, a touchscreen display that serves both as a display device and an input device may be used.

Next, the respective images displayed on the display device 24 will be described. As described above, the ophthalmic device of the present embodiment generates a plurality of images (such as the light scattering intensity tomographic image, entropy tomographic image, and birefringence tomographic image) from the same part of the subject eye by photographing the same part of the subject eye (such as the retina). By comparing the plurality of images obtained from the same part of the subject eye, the operator can identify the condition of the subject eye in detail.

Figure 2:
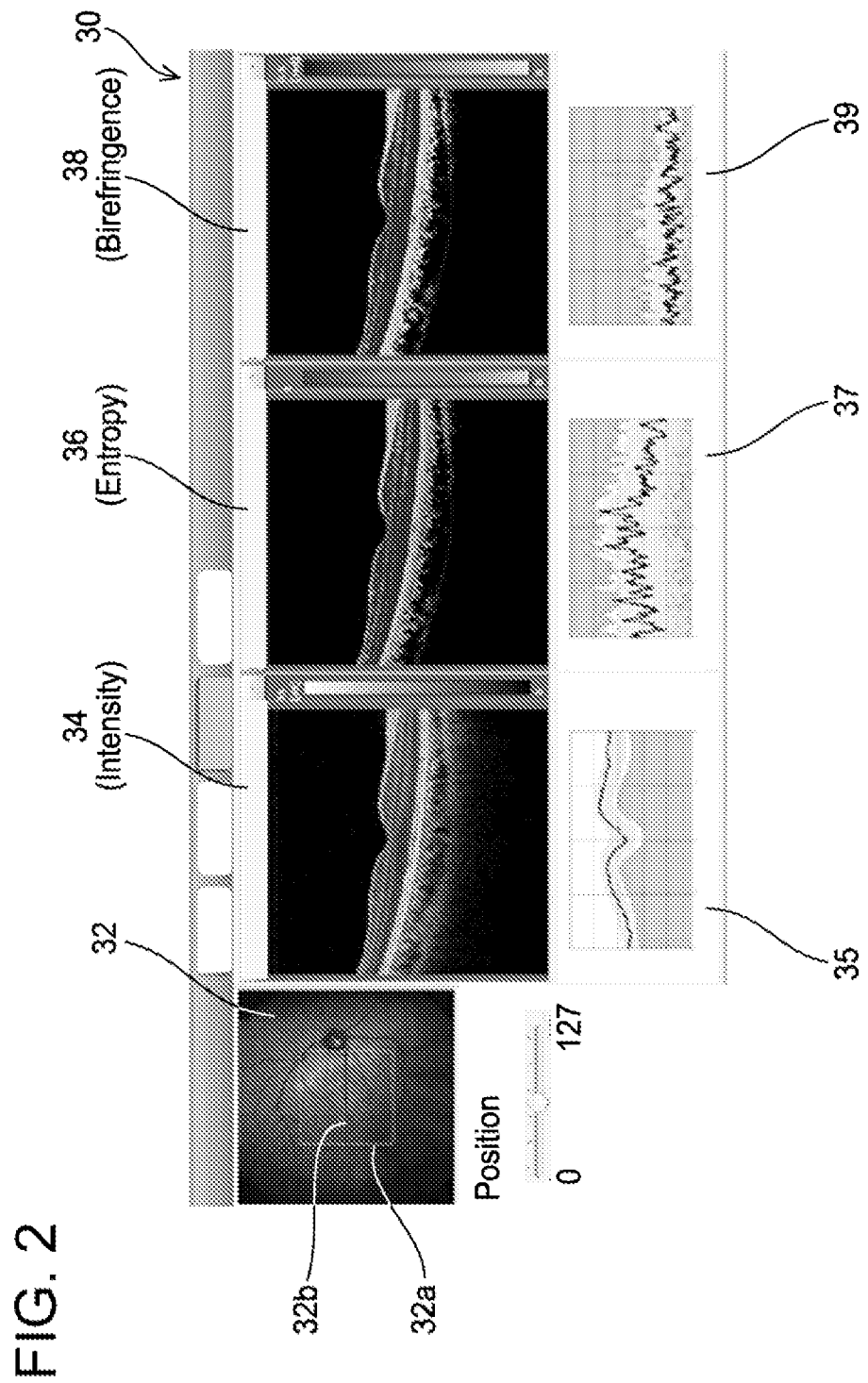
FIG. 2 is an example of images displayed on a display device of the ophthalmic device of the embodiment.

FIG. 2 shows an example of images displayed on the display device 24. In an image 30 shown in FIG. 2, a fundus image 32, a light scattering intensity tomographic image 34, an entropy tomographic image 36, and a birefringence tomographic image 38 of the subject eye are displayed on the same screen. The fundus image 32 includes a rectangular region indicator 32a indicating a region that was photographed by the polarization-sensitive OCT 20 and a position indicator 32b in a form of a straight line indicating a position of the respective tomographic images 34, 36, 38 as displayed. By having the position indicator 32b displayed in the fundus image 32, the operator can easily identify which position within the photographed region of the subject eye (that is, the region indicator 32a) the displayed tomographic images corresponds to. The light scattering intensity tomographic image 34 indicates scattering intensity of the light reflected from the respective tissues in the subject eye, and a graph 35 indicating the thicknesses of the respective tissues obtained by analyzing the light scattering intensity tomographic image 34 is displayed together. The entropy tomographic image 36 indicates the entropy values of the respective tissues of the subject eye, and a graph 37 indicating the entropy value in a specific part of the entropy tomographic image is displayed together. Specifically, the graph 37 indicates the entropy value (average thereof) in a retinal pigment epithelium (RPE). The birefringence tomographic image 38 indicates the birefringence values of the respective tissues of the subject eye, and a graph 39 indicating the birefringence value in a specific part of the birefringence tomographic image is displayed together. Specifically, the graph 39 indicates the birefringence value (average value) in the retina. As it is apparent from the drawing, in the image 30, the light scattering intensity tomographic image 34, the entropy tomographic image 36, and the birefringence tomographic image 38 in the same cross section of the subject eye are displayed simultaneously, these tomographic images can easily be compared. On the other hand, since the size of each of the tomographic images 34, 36, 38 becomes small, it becomes more difficult to examine the details of these images 34, 36, 38.

Figure 3:
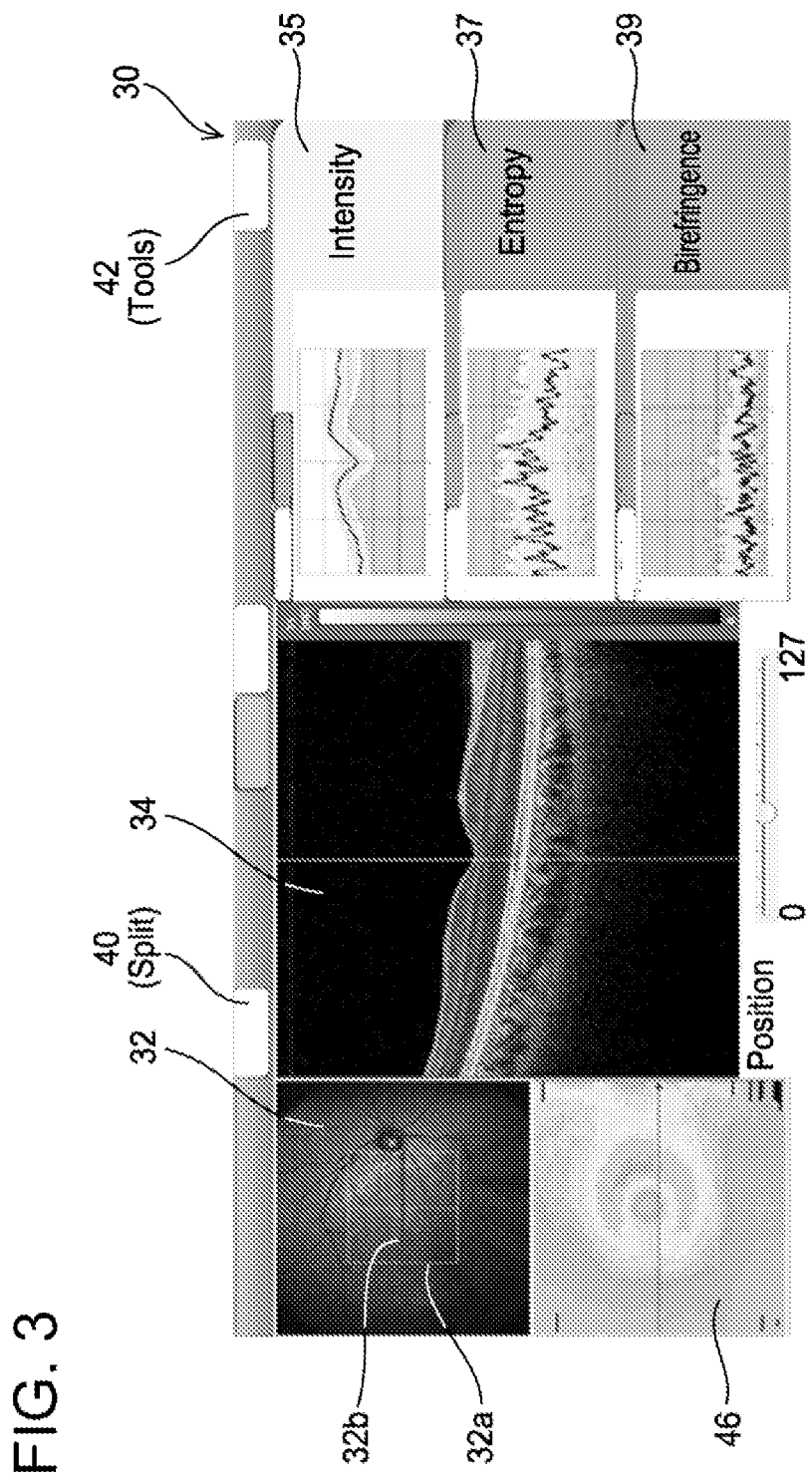
FIG. 3 is another example of images displayed on the display device of the ophthalmic device of the embodiment.

To address this, in the ophthalmic device of the present embodiment, an image 30 shown in FIG. 3 is displayed on the display device 24 when the operator inputs a predetermined instruction through the input device 22. In the image 30 shown in FIG. 3, only the light scattering intensity tomographic image 34 is displayed with increased size, and the graphs 35, 37, 39 are displayed on the right side of the light scattering intensity tomographic image 34. As it is apparent from FIG. 3, since the light scattering intensity tomographic image 34 is displayed with the increased size, it becomes easier to examine the details of the light scattering intensity tomographic image 34, however, the image 34 cannot be compared with the entropy tomographic image 36 and the birefringence tomographic image 38. As shown in FIG. 3, the image 30 further displays a split button 40 for inputting an instruction to partition the light scattering intensity tomographic image 34, and a tool button 42 for performing respective settings. Further, an en-face image 46 of the portion surrounded by the region indicator 32a is displayed below the fundus image 32. The en-face image 46 is generated by processing light scattering intensity tomographic images 34 generated for respective scan lines (that is, a plurality of light scattering intensity tomographic images 34 generated for every scan line in the portion surrounded by the region indicator 32a). In the image 30 shown in FIG. 3, the light scattering intensity tomographic image 34 is displayed with the increased size, however, the entropy tomographic image 36 or the birefringence tomographic image 38 may alternatively be displayed with increased size.

Figure 4:
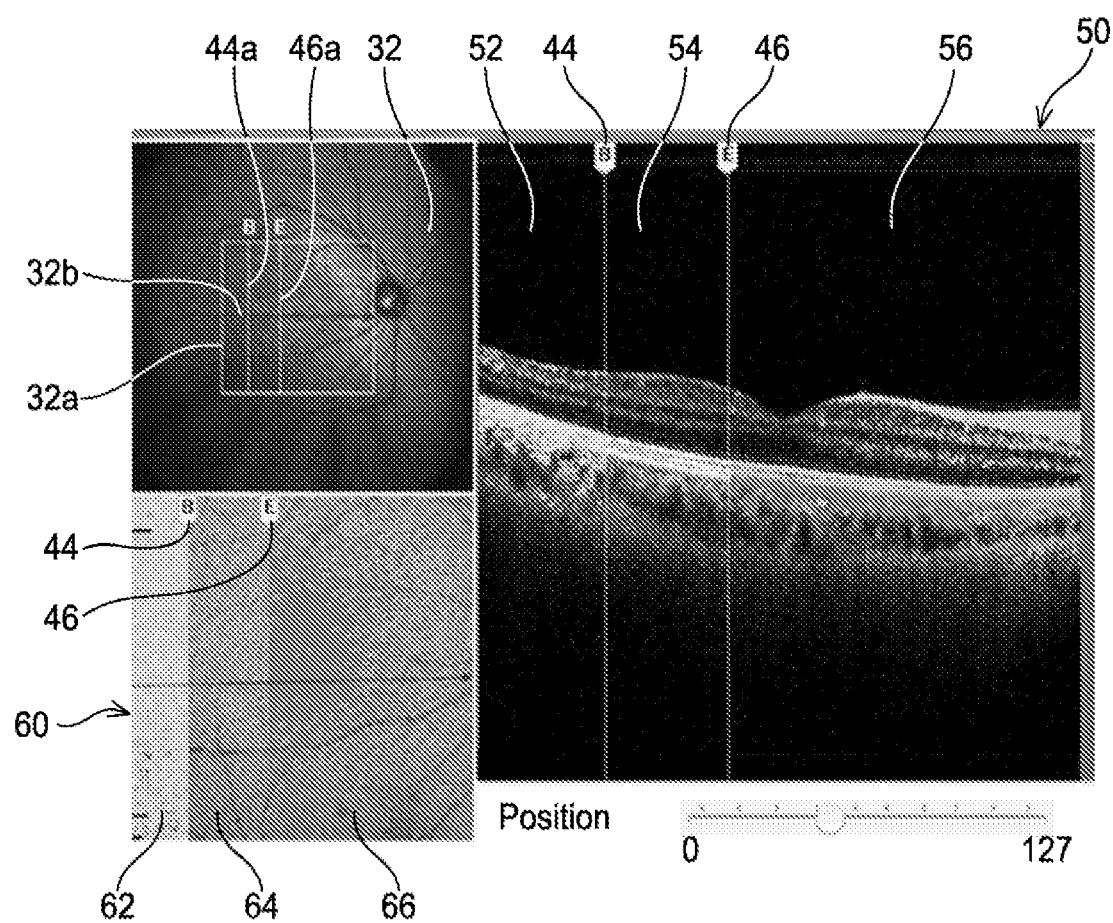
FIG. 4 is yet another example of images displayed on the display device of the ophthalmic device of the embodiment.

In the image 30 shown in FIG. 3, since only the light scattering intensity tomographic image 34 is displayed, the light scattering intensity tomographic image 34 cannot be compared with the other tomographic images 36, 38. To address this, in the ophthalmic device of the present embodiment, the operator operates the input device 22 to move a pointer displayed in the screen to the split button 40 and click on this button. By doing so, the display device 24 displays an image shown in FIG. 4. In FIG. 4, only the portions of the image 30 shown in FIG. 3 corresponding to the fundus image 32, the en-face image 46, and the light scattering intensity tomographic image 34 are displayed. That is, in FIG. 4, display of the graphs 35, 37, 39 is omitted.

As it is apparent from FIG. 4, the image 50 is partitioned into three regions 52, 54, 56 by a first boundary line 44 and a second boundary line 46. The first boundary line 44 and the second boundary line 46 extend parallel to sides of the rectangular image 50 extending in a vertical direction (Y-axis direction) (that is, vertical sides thereof). Since the image 50 is partitioned by the two boundary lines 44, 46 extending in the vertical direction (Y-axis direction), the partitioned regions 52, 54, 56 also become rectangular, and these regions 52, 54, 56 are arranged adjacently along a horizontal direction (X-axis direction).

The light scattering intensity tomographic image 34 and the birefringence tomographic image 38 are displayed by being superimposed on each other in the region 52 (region between the left vertical side of the image 50 and the first boundary line 44). That is, in the region 52, a portion of the light scattering intensity tomographic image 34 corresponding to the region 52 and a portion of the birefringence tomographic image 38 corresponding to the region 52 are displayed by being superimposed on each other. In the region 54 (region between the first boundary line 44 and the second boundary line 46), only the light scattering intensity tomographic image 34 is displayed. That is, in the region 54, only a portion of the light scattering intensity tomographic image 34 corresponding to the region 54 is displayed. In the region 56 (region between the right vertical side of the image 50 and the second boundary line 46), the light scattering intensity tomographic image 34 and the entropy tomographic image 36 are displayed by being superimposed on each other. That is, in the region 56, a portion of the light scattering intensity tomographic image 34 corresponding to the region 56 and a portion of the entropy tomographic image 36 corresponding to the region 56 are displayed by being superimposed on each other.

Figure 10:
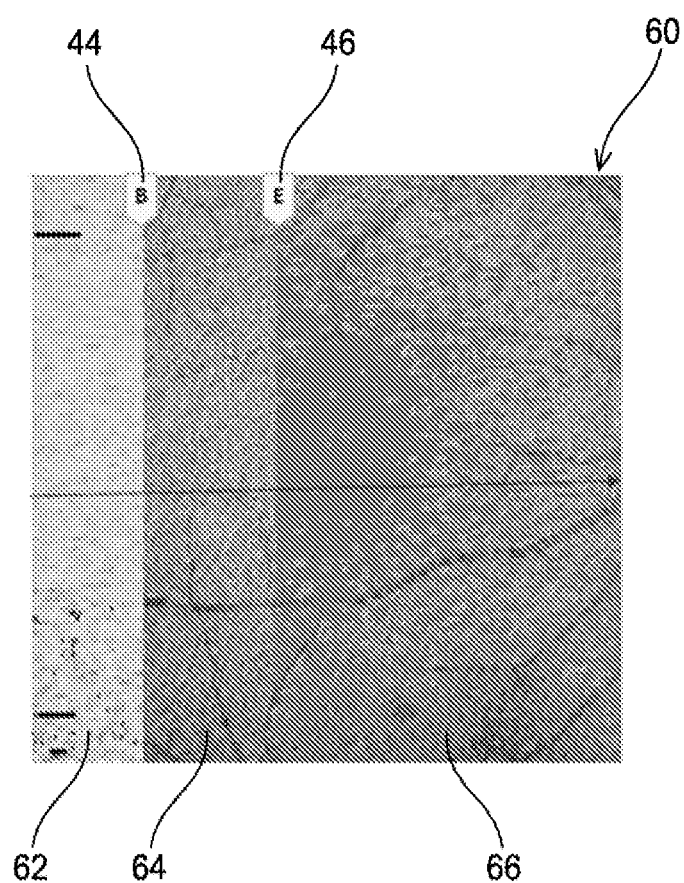
FIG. 10 is an enlarged view of an en-face image (Enface image) displayed in FIG. 4.

As shown in FIGS. 4 and 10, the en-face image 60 is partitioned into three regions 62, 64, 66 by the first boundary line 44 and the second boundary line 46 similar to the aforementioned image 50. In the region 62, an en-face image generated from the light scattering intensity tomographic images 34 corresponding to the region 62 and an en-face image generated from the birefringence tomographic images 38 corresponding to the region 62 are displayed by being superimposed on each other. In the region 64, an en-face image generated from the light scattering intensity tomographic images 34 corresponding to the region 64 is displayed. In the region 66, an en-face image generated from the light scattering intensity tomographic images 34 corresponding to the region 66 and an en-face image generated from the entropy tomographic images 36 corresponding to the region 66 are displayed by being superimposed on each other.

As it is apparent from FIG. 4, the fundus image 32 displays therein the region indicator 32*a*, the position indicator 32*b*, and further a straight line 44*a* indicating the first boundary line 44 and a straight line 46*a* indicating the second boundary line 46. Due to this, the operator can easily acknowledge the positions of the first boundary line 44 and the second boundary line 46.

Here, in the ophthalmic device of the present embodiment, the position of the first boundary line 44 and the position of the second boundary line 46 can be moved by the operator's operation. Specifically, the operator operates the input device 22 and moves the pointer in the screen onto the first boundary line 44 or the second boundary line 46, and drags the first boundary line 44 or the second boundary line 46 (moves the same while clicking on it). Due to this, the position of the first boundary line 44 and/or the position of the second boundary line 46 can be moved to desired positions.

Figure 5:
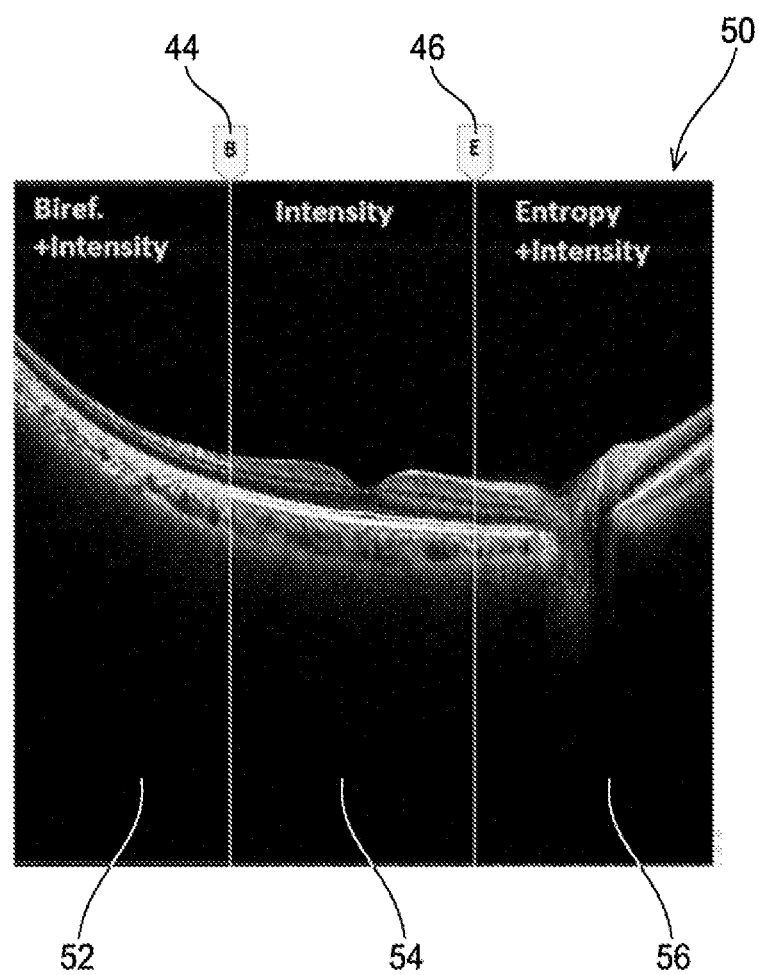
FIG. 5 is an enlarged view of a part of the image shown in FIG. 4.

Changes in the images 50 when the positions of the first boundary line 44 and the second boundary line 44 are changed will be described with reference to FIGS. 5 to 7. As shown in FIG. 5, the image 50 is partitioned into three regions 52, 54, 56 by the first boundary line 44 and the second boundary line 46, and the first boundary line 44 is located to the left of the second boundary line 46. As described above, in the state shown in FIG. 5, the light scattering intensity tomographic image 34 and the birefringence tomographic image 38 are displayed in the region 52 by being superimposed on each other, only the light scattering intensity tomographic image 34 is displayed in the region 54, and the light scattering intensity tomographic image 34 and the entropy tomographic image 36 are displayed in the region 56 by being superimposed on each other.

Figure 6:
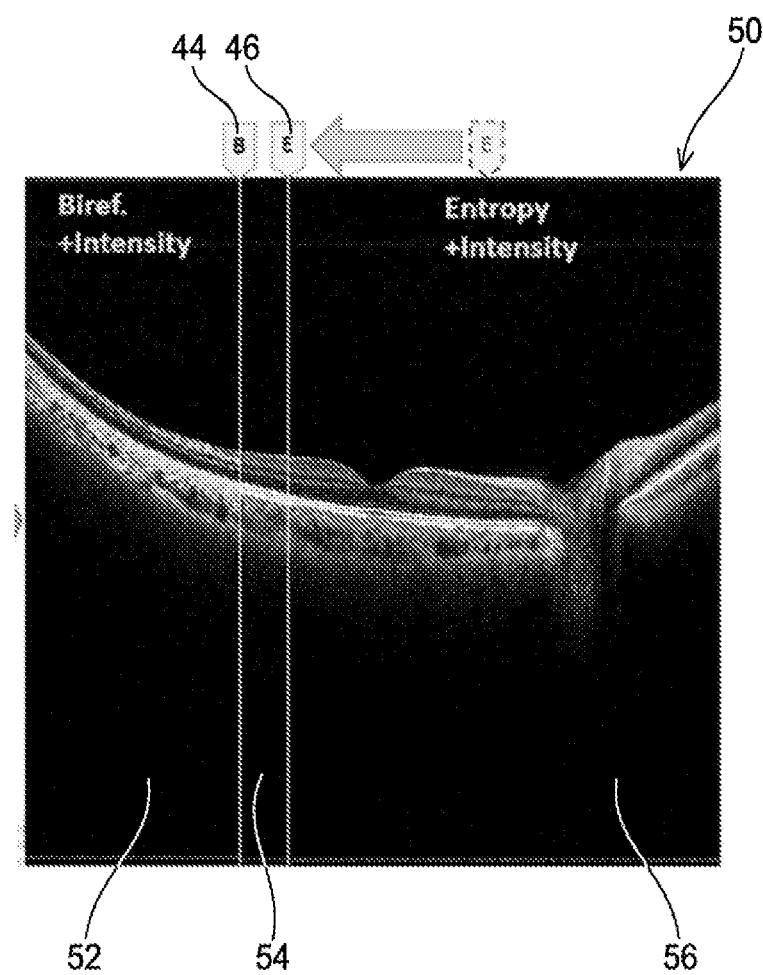
FIG. 6 is an image displayed when a position of a boundary line in the image shown in FIG. 5 is changed.

When the position of the second boundary line 46 is moved from the state shown in FIG. 5 toward the first boundary line 44 as shown in FIG. 6, the region 54 becomes narrower while the region 56 becomes wider as the second boundary line 46 moves. As a result of this, the area of the light scattering intensity tomographic image 34 displayed in the region 54 becomes smaller, and the area of the superimposed image of the light scattering intensity tomographic image 34 and the entropy tomographic image 36 displayed in the region 56 becomes larger.

Figure 7:
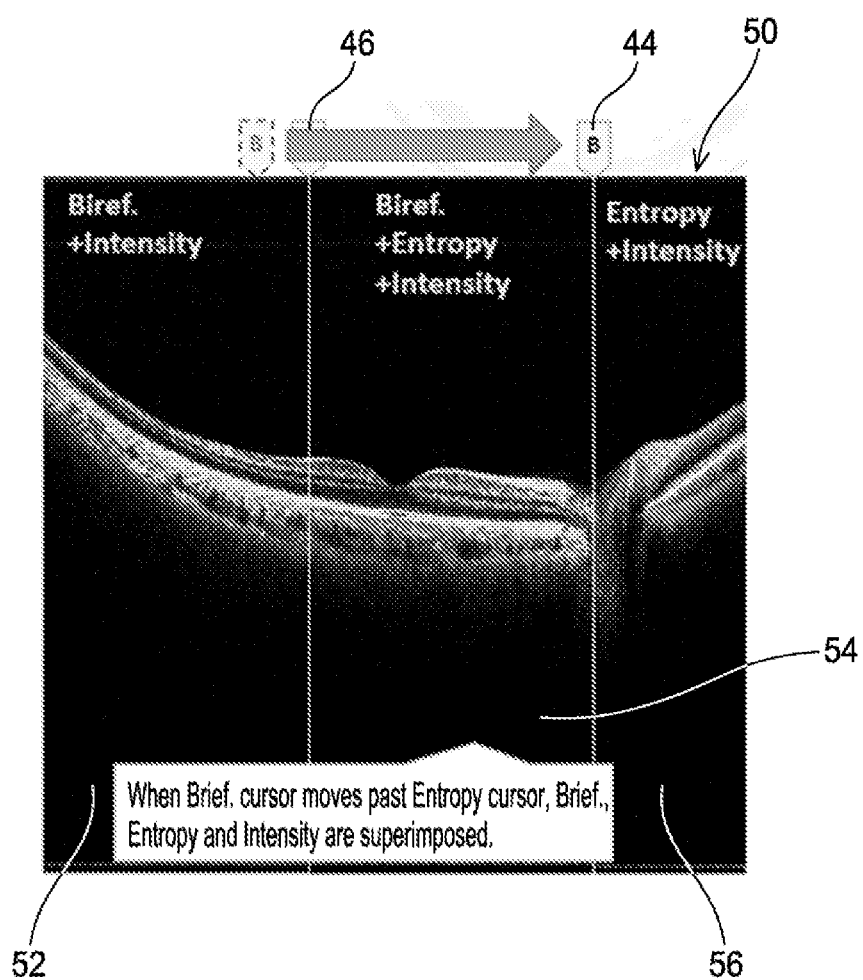
FIG. 7 is an image displayed when the position of the boundary line in the image shown in FIG. 6 is changed.

Then, as shown in FIG. 7, the first boundary line 44 is moved rightward beyond the second boundary line 46. Until the first boundary line 44 moves past the second boundary line 46, the region 52 in which the light scattering intensity tomographic image 34 and the birefringence tomographic image 38 are displayed by being superimposed becomes wider while the region 54 in which only the light scattering intensity tomographic image 34 is displayed becomes narrower as the first boundary line 44 moves rightward. When the first boundary line 44 further moves rightward beyond the second boundary line 46, the light scattering intensity tomographic image 34 and the birefringence tomographic image 38 are displayed by being superimposed on each other in the region 52 to the left of the second boundary line 46 (region between the second boundary line 46 and the left vertical side of the image 50). On the other hand, the light scattering intensity tomographic image 34, the entropy tomographic image 36, and the birefringence tomographic image 38 are displayed by being superimposed on each other in the region 54 interposed between the second boundary line 46 and the first boundary line 44. Further, in the region 56 to the right of the first boundary line 44 (region between the first boundary line 44 and the right vertical side of the image 50), the light scattering intensity tomographic image 34 and the entropy tomographic image 36 are displayed by being superimposed on each other. That is, in the present embodiment, the region in which the birefringence tomographic image 38 is displayed is controlled by the first boundary line 44 such that the birefringence tomographic image 38 is displayed to the left of the first boundary line 44 but is not displayed to the right of the first boundary line 44. Further, the region in which the entropy tomographic image 36 is displayed is controlled by the second boundary line 46 such that the entropy tomographic image 36 is displayed to the right of the second boundary line 46 but is not displayed to the left of the second boundary line 46. The light scattering intensity tomographic image 34 is displayed in all of the regions 52, 54, 56.

When the plurality of tomographic images 34, 36, 38 is to be displayed by being superimposed on each other in the respective regions 52, 54, 56, the superimposition may be performed in the desired order by the operator's operation. Specifically, the operator operates the input device 22 and clicks on the tool button 42 (shown in FIG. 3). By doing so, a setting screen is displayed in the display device 24, and the order of superimposing the plurality of tomographic images 34, 36, 38 can thereby be set. For example, the light scattering intensity tomographic image 34, the entropy tomographic image 36, and the birefringence tomographic image 38 may be superimposed from bottom to top in this order. Alternatively, the light scattering intensity tomographic image 34, the birefringence tomographic image 38, and the entropy tomographic image 36 may be superimposed from bottom to top in this order.

Further, in the present embodiment, the region in which the birefringence tomographic image 38 is displayed is controlled by the first boundary line 44 and the region in which the entropy tomographic image 36 is displayed is controlled by the second boundary line 46, however, this specific example is not limiting. For example, the region in which the entropy tomographic image 36 is displayed may be controlled by the first boundary line 44 and the region in which the birefringence tomographic image 38 is displayed may be controlled by the second boundary line 46. Alternatively, the region in which the light scattering intensity tomographic image 34 is displayed may be controlled by the first boundary line 44 or the second boundary line 46.

Figure 8:
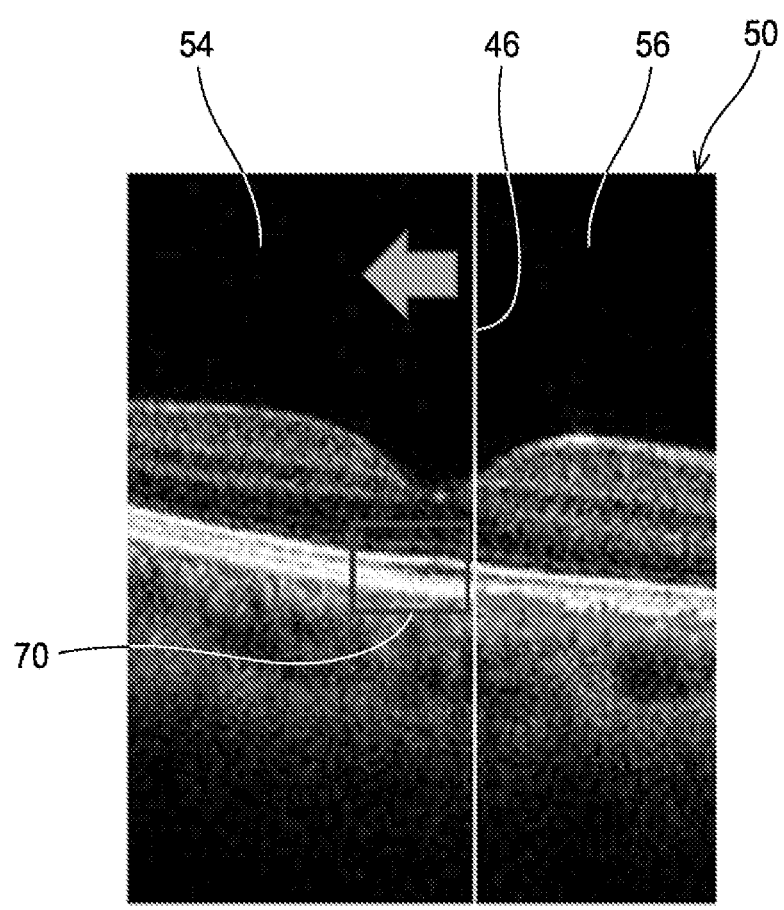
FIG. 8 is an example of an image displayed when details of the image is to be examined while the position of the boundary line is being changed.
Figure 9:
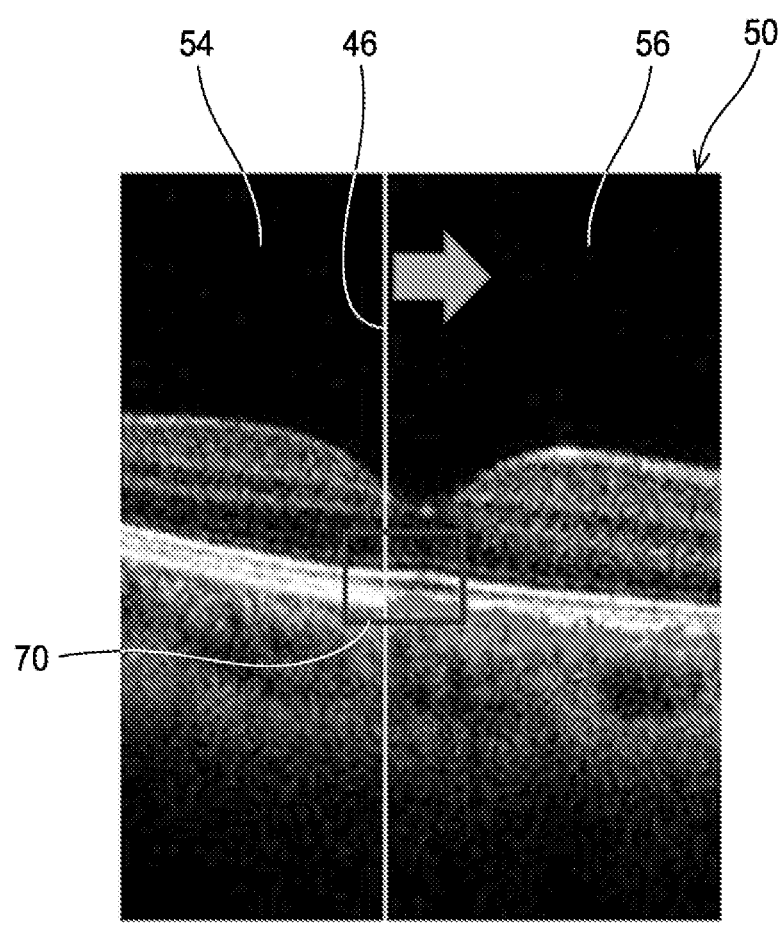
FIG. 9 is another example of the image displayed when the details of the image is to be examined while the position of the boundary line is being changed.

In the ophthalmic device of the present embodiment, the display state is switched between the state in which the light scattering intensity tomographic image 34, the entropy tomographic image 36, and the birefringence tomographic image 38 are displayed on the same screen (state shown in FIG. 2) and the state in which one of the light scattering intensity tomographic image 34, the birefringence tomographic image 38, and the entropy tomographic image 36 is displayed with its size enlarged (states shown in FIGS. 3 and 4). The details of the light scattering intensity tomographic image 34, the birefringence tomographic image 38, and the entropy tomographic image 36 can easily be examined, and these tomographic images can easily be compared. Especially, since the operator can move the boundary lines 44, 46 to the desired positions, the details of the images 34, 36 can be compared while changing the position of the boundary between the light scattering intensity tomographic image 34 shown in the region 54 and the image shown in the region 56 on which the light scattering intensity tomographic image 34 and the entropy tomographic image 36 are superimposed (position of the boundary line 46) as shown in FIGS. 8 and 9 for example, Due to this, the condition of the tissues in the subject eye and the polarization states in the tomographic images of the subject eye can easily be identified.

(Corresponding Relationship)

The processing device 10 is an example of "first image input unit", "second image input unit", and "third image input unit". The display device 24 is an example of "display unit". The regions 52, 54, 56 are examples of "first region", "second region" and "third region". The first boundary line 44 is an example of "first boundary line", and the second boundary line 46 is an example of "second boundary line". The input device 22 is an example of "first boundary line input unit" and "second boundary line input unit". The light scattering intensity tomographic image 34, the birefringence tomographic image 38, and the entropy tomographic image 36 are examples of "first photographed image", "second photographed image", and "third photographed image".

Figure 11:
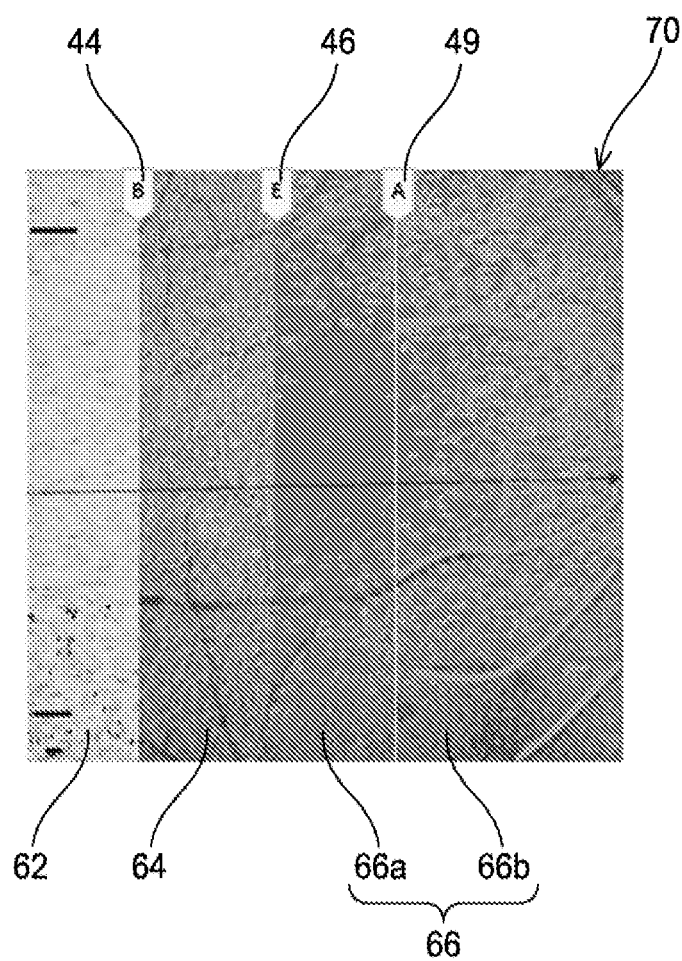
FIG. 11 is an example of another en-face image (OCT-A image) displayed on the display device.

In the aforementioned embodiment, as shown for example in FIGS. 4 and 10, the en-face image 60 is partitioned into the three regions 62, 64, 66 by the first boundary line 44 and the second boundary line 46 and the respective en-face images are superimposed in these three regions 62, 64, 66, however, the art disclosed herein is not limited to such a configuration. As shown for example in FIG. 11, an en-face image 70 may be partitioned by three boundary lines 44, 46, 49. In the example shown in FIG. 11, the region 66 is partitioned by the third boundary line 49 into a region 66a and a region 66b. Further, in the region 66b, the en-face image generated from the light scattering intensity tomographic images 34, the en-face image generated from the entropy tomographic images 36, and the en-face image that extracted angiogram (so-called OCT-A image) are displayed by being superimposed on each other. That is, the third boundary line 49 is a boundary line for controlling the region in which the en-face image that extracted the angiogram (so-called OCT-A image) is to be displayed, and the region in which the en-face image that extracted the angiogram (so-called OCT-A image) is displayed can be adjusted by changing the position of the third boundary line 49. That is, the number of regions the photographed image is partitioned into is not limited to three or four as described above, but may be partitioned into arbitrary number of regions (such as two regions or five or more regions).

Further, in the aforementioned embodiment, the regions 52, 54, 56 partitioned by the boundary lines 44, 46 display the images obtained by superimposing the respective tomographic images 34, 36, 38, however, the art disclosed herein is not limited to such an example. For example, the region 52 may display only a first tomographic image, the region 54 may display only a second tomographic image that is different from the first tomographic image, and the region 56 may display only a third tomographic image that is different from both the first and second tomographic images. That is, in such a case, the first, second, and third tomographic images are not superimposed but rather simply synthesized. Even in such an example, the first, second, and third tomographic images can easily be compared.

Further, the example in the aforementioned embodiment compares the plurality of images photographed at the same timing, however, the art disclosed herein is not limited to such an example. For example, two images of the same part of the subject eye that were photographed at different timings (such as a pre-operation tomographic image of the subject eye and a post-operation tomographic image of the subject eye) may be displayed for comparison. That is, one screen may be partitioned into two regions by a boundary line, and one of the images (such as the pre-operation tomographic image of the subject eye) may be displayed in one region and the other of the images (such as the post-operation tomographic image of the subject eye) may be displayed in the other region. In such a configuration, the two images (such as the pre-operation tomographic image and the post-operation tomographic image of the subject eye) can be compared while the position of the boundary line is being changed, and the prognosis of the operation on the subject eye can be evaluated in detail.

Further, the aforementioned embodiment uses the polarization-sensitive OCT, however, such an example is not limiting. The types of the optical coherence tomography is not particularly limited, and an optical coherence tomography device that is not polarization-sensitive may be used. Further, the art disclosed herein may be applied to ophthalmic devices other than the OCT (such as a fundus camera).

Figure 12:
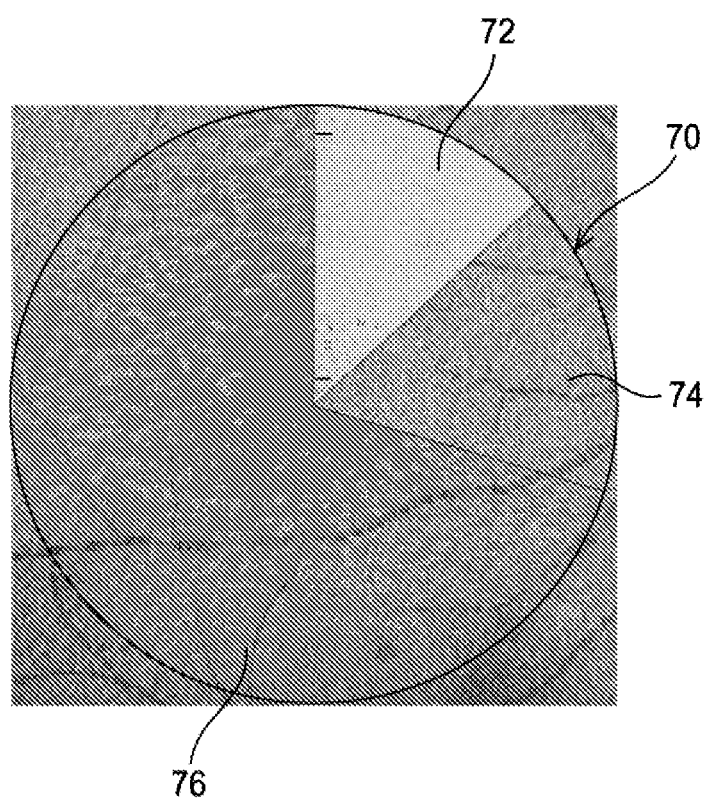
FIG. 12 is an example of another en-face image (Enface image) displayed on the display device.
Figure 13:
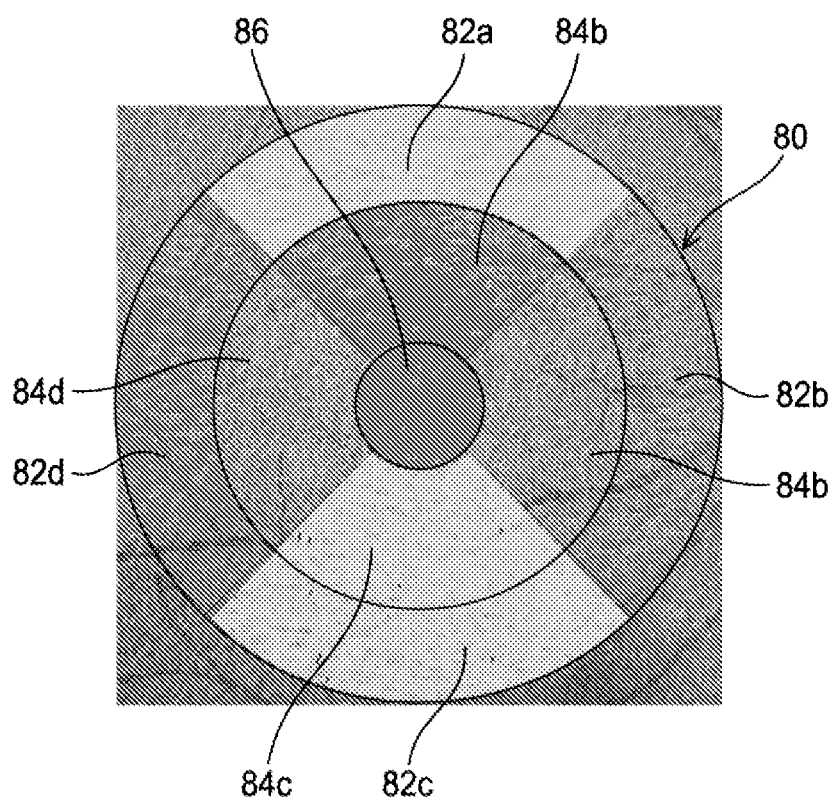
FIG. 13 is an example of still another en-face image (Enface image) displayed on the display device.

Further, the example in the aforementioned embodiment partitions the tomographic images of which outer shape is rectangular by using the boundary line(s), however, the art disclosed herein is not limited to such example. For example, as shown in FIG. 12, an image 70 of which outer shape is circular (such as a fundus image) may be partitioned along a circumferential direction by boundary lines (such as lines extending radially from the center of the circle), and different images may be displayed in sectors 72, 74, 76 created as the result of the partitioning. In this case, the boundary line(s) may be moved in the circumferential direction, by which the angular ranges of the respective sectors 72, 74, 76 change, and the displayed images may change according to the changes in the angular ranges. Alternatively, as shown in FIG. 13, an image 80 of which outer shape is circular may be partitioned in a radial direction by boundary lines (into concentric circles), and different images may be displayed in the respective portioned regions (circular region 86 or annulus sectors 84a to 84d, 82a to 82d) created as the result of the partitioning. In this case, the boundary line(s) may be moved in the radial direction, by which the length of the respective regions 86, 84a to 84d, 82a to 82d in the radial direction change, and the displayed images may change according to the changes in the length. Furthermore, in a chart partitioned into a plurality of regions, each region may display an image assigned to the region. In this case, the areas of the regions may change by changing position(s) of boundary line(s) being boundary (ies) between the regions, and the areas of the displayed images may change in accordance with the area changes.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. An image processing device configured to process a photographed image of a subject eye, the image processing device comprising:
    a first image input unit to which a first photographed image obtained by photographing a specific part of the subject eye is inputted;
    a second image input unit to which a second photographed image obtained by photographing the specific part of the subject eye is inputted;
    a third image input unit to which a third photographed image obtained by photographing the specific part of the subject eye is inputted; and
    display unit configured to display a synthesized image obtained by synthesizing the first photographed image, the second photographed image, and the third photographed image;
    wherein
    the synthesized image is partitioned into at least a first region, a second region, and a third region by a first boundary line and a second boundary line,
    the display unit is configured to display, in the first region, at least a portion which is a part of the first photographed image and corresponds to the first region within the specific part,
    the display unit is configured to display, in the second region, at least a portion which is a part of the second photographed image and corresponds to the second region within the specific part,
    the display unit is configured to display, in the third region, at least a portion which is a part of the third photographed image and corresponds to the third region within the specific part; and
    an image displayed in the first region is different from an image displayed in the second region.

2. The image processing device according to claim 1, further comprising:
    a first boundary line input unit configured to input a position of the first boundary line; and
    a second boundary line input unit configured to input a position of the second boundary line;
    wherein
    the first boundary line input unit is configured to be operated by an operator, and the position of the first boundary line is configured to be changed by the operator, and
    the second boundary line input unit is configured to be operated by the operator, and the position of the second boundary line is configured to be changed by the operator.

3. The image processing device according to claim 1, wherein
    the display unit is configured to display, in at least one of the first region, the second region, and the third region, a superimposed image obtained by superimposing at least two of the first photographed image, the second photographed image, and the third photographed image, and
    the display unit is configured to:
    when displaying the superimposed image in the first region, display an image obtained by superimposing a portion which is a part of the first photographed image and corresponds to the first region within the specific part and a portion which is a part of at least one of the second photographed image and the third photographed image and corresponds to the first region within the specific part,
    when displaying the superimposed image in the second region, display an image obtained by superimposing a portion which is a part of the second photographed image and corresponds to the second region within the specific part and a portion which is a part of at least one of the first photographed image and the third photographed image and corresponds to the second region within the specific part, and
    when displaying the superimposed image in the third region, display an image obtained by superimposing a portion which is a part of the third photographed image and corresponds to the third region within the specific part and a portion which is a part of at least one of the first photographed image and the second photographed image and corresponds to the third region within the specific part.

4. The image processing device according to claim 1, wherein
    the first photographed image is a birefringence image obtained by photographing the subject eye with a polarization-sensitive OCT,
    the second photographed image is a light scattering intensity image obtained by photographing the subject eye with the polarization-sensitive OCT, and
    the third photographed image is an entropy image obtained by photographing the subject eye with the polarization-sensitive OCT.

5. An ophthalmic device comprising:
a polarization-sensitive OCT configured to photograph a subject eye;
an image generation unit configured to generate a plurality of images by photographing a specific part of the subject eye with the polarization-sensitive OCT; and
an image processing device according to claim 1 configured to process the plurality of images generated by the image generation unit.

6. An image processing device configured to process a photographed image of a subject eye, the image processing device comprising:
a first image input unit to which a first photographed image obtained by photographing a specific part of the subject eye is inputted;
a second image input unit to which a second photographed image obtained by photographing the specific part of the subject eye is inputted;
a third image input unit to which a third photographed image obtained by photographing the specific part of the subject eye is inputted; and
display unit configured to display a synthesized image obtained by synthesizing the first photographed image, the second photographed image, and the third photographed image;
wherein
the synthesized image is partitioned into at least a first region and a second region by a first boundary line,
the display unit is configured to display, in the first region, at least a portion which is a part of the first photographed image and corresponds to the first region within the specific part,
the display unit is configured to display, in the second region, at least a portion which is a part of the second photographed image and corresponds to the second region within the specific part,
an image displayed in the first region is different from an image displayed in the second region,
the synthesized image is a rectangular image and has a pair of first sides extending in an X-axis direction and a pair of second sides extending in a Y-axis direction,
the synthesized image is partitioned into a plurality of regions by the first boundary line and a second boundary line,
each of the first boundary line and second boundary line is a straight line extending parallel to the pair of first sides or the pair of second sides,
the display unit is configured to display, in a region among the regions located between the first boundary line and one of the pair of first sides or one of the pair of second sides parallel to the first boundary line within the synthesized image, an image obtained by superimposing a portion of the first photographed image and a portion of the second photographed image corresponding to the region,
the display unit is configured to display, in a region among the regions located between the second boundary line and the other of the pair of first sides or the other of the pair of second sides parallel to the first boundary line within the synthesized image, an image obtained by superimposing a portion of the second photographed image and a portion of the third photographed image corresponding to the region,
when the first boundary line is located closer to the one of the pair of first sides or the one of the pair of second sides and the second boundary line is located closer to the other of the pair of first sides or the other of the pair of second sides, the display unit is configured to display, in a region among the regions located between the first boundary line and the second boundary line, a portion of the second photographed image corresponding to the region, and
when the first boundary line is located closer to the other of the pair of first sides or the other of the pair of second sides and the second boundary line is located closer to the one of the pair of first sides or the one of the pair of second sides, the display unit is configured to display, in a region among the regions located between the first boundary line and the second boundary line, an image obtained by superimposing a portion of the first photographed image, a portion of the second photographed image, and a portion of the third photographed image corresponding to the region.

* * * * *